United States Patent

Terashita

[11] Patent Number: 6,081,343
[45] Date of Patent: Jun. 27, 2000

[54] DIGITAL PRINTER AND IMAGE DATA CONVERSION METHOD THEREFOR

[75] Inventor: Takaaki Terashita, Kanagawa, Japan

[73] Assignee: Fuji Photo Film Co., Ltd., Kanagawa, Japan

[21] Appl. No.: 08/757,947

[22] Filed: Nov. 27, 1996

[30] Foreign Application Priority Data

Nov. 28, 1995 [JP] Japan .................................... 7-309169
Dec. 11, 1995 [JP] Japan .................................... 7-321599

[51] Int. Cl.[7] ........................................................ G03F 3/08
[52] U.S. Cl. .......................... 358/1.9; 358/521; 358/523
[58] Field of Search .................................... 358/296, 302, 358/401, 448, 501, 521, 522, 523, 520, 524, 527, 1.9, 1.1, 1.8, 1.2; 382/162, 165

[56] References Cited

U.S. PATENT DOCUMENTS

| | | | |
|---|---|---|---|
| 4,679,095 | 7/1987 | Kitamura et al. | 358/280 |
| 4,893,180 | 1/1990 | Shigaki et al. | 358/80 |
| 5,353,095 | 10/1994 | Terashita | 355/38 |

*Primary Examiner*—Madeleine Nguyen
*Attorney, Agent, or Firm*—Sughrue, Mion, Zinn, Macpeak & Seas, PLLC

[57] ABSTRACT

First characteristic values of a reference film is stored in a first characteristic value memory, whereas second characteristic values of each type of recording media of the originals is stored in a second characteristic value memory, to produce a gradation balance conversion table for each color from the first and second characteristic values. Image data of an original is converted according to the gradation balance conversion tables, so as to make the color balance proper in all density ranges from highlight through shadow points, even if the original image is under-exposed or over-exposed. The gradation balance converted image data is converted through an image data conversion device into recording data to record a reproduced image as a hard copy of the original.

14 Claims, 13 Drawing Sheets

DIGITAL PRINTER AND IMAGE DATA CONVERSION METHOD THEREFOR

BACKGROUND OF THE INVENTION

1. Field of the Invention

The present invention relates to a digital printer and an image data conversion method for the digital printer wherein image data obtained from a photographic image is processed to be digital image data for reproducing the image as a hard copy.

2. Background Arts

In a conventional digital printer, an image signal is obtained from a reflective original such as a photo-print or a transparent original such as a frame on a photographic film, and the image signal is processed to obtain image control values. Based on the image control values, an image is reproduced and recorded on a photographic paper or another recording material. For example, JPA 2-157758 discloses determining a reference density point for each color component based on a highlight density and a shadow density in the original, and setting up a gradation conversion curve to assign these reference density values to given signal levels.

JPA 6-242521 discloses dividing a scene into several areas to detect a maximum value and a minimum value of each color from each area, determining a maximum reference value and a minimum reference value from these maximum and minimum values. The maximum reference values of three colors, i.e. red (R), green (G) and blue (B), are reproduced as white, whereas the minimum reference values of three colors as black.

JPA 6-178113 discloses producing a histogram from image data, accumulating histograms of a plurality of images according to the type of recording media, and determining gradation curves based on the image data and the accumulated histogram data, to produce a conversion table for the image reproduction. This publication also discloses modifying the histogram to eliminate lopsided frequencies in some density levels, and selecting those images relating to one another among from a series of images, to utilize as image representative values for reproduction conversion curves.

JPA 2-184837 discloses obtaining characteristic curves of negative films under single-color exposures, storing these curves, and converting improperly exposed originals such as under-exposed and over-exposed negatives into single-color exposure densities, to reproduce the images after correcting the non-linearity of the characteristic curves of the improperly exposed originals.

Using previously stored reference gradation curves for setting up a gradation of a digital image is widely known, for example, from JPA 60-3778, JPA 60-216350, JPA 62-111569, JPA 62-111571 and JPA 63-42575. JPA 60-37878 discloses previously storing a plurality of standard gradation curves, and selecting among from those standard gradation curves a most proximate to a gradation curve that is produced from an original. JPA 60-216350, JPA 62-11569 and JPA 62-111571 disclose correcting a stored reference gradation conversion curve according to data of specific points. JPA 63-42575 discloses using a third gradation conversion curve that is obtained by composing a standard gradation conversion curve with a gradation conversion curve determined based on an original.

In almost all conventional digital image recording methods, highlight and shadow of the original are controlled to be reproduced as highlight and shadow in the reproduced image, as above described JPA 2-157758. This method is disadvantageous when the highlight and shadow of the original are not white and black. In a case where a scene is divided into a plurality of regions to determine a maximum reference value and a minimum reference value from maximum values and minimum values of respective colors in the respective regions, like JPA 6-242521, dividing the scene can result in wrong reference values. To determine single-light exposure characteristic curves for each film type like in JPA 2-184837 is not useful in practice. The method as disclosed in JPA 6-178113, wherein a histogram is made from image data and the histogram is accumulated in a memory provided for each type of recording media, is useful for those recording media like reversal films where exposure amounts on photography are substantially uniform and most images are properly exposed. However, for those recording media like negative films where color balance, gradation and other characteristic values vary depending upon exposure amounts on photography, the histogram varies according to the exposure amount even for the same photographic subject, so that it is difficult to exactly obtain necessary film properties from simple accumulation of the histograms.

FIGS. 19A to 19C are density histograms for red (R-density) of images of the same subject recorded on a negative film, but respectively under-exposed, properly exposed and over-exposed ones. As seen from these diagrams, even if the images are photographed from the same subject on the same negative film, their histograms vary depending upon exposure conditions. Concerning originals on negative film, accumulation of their histograms does not result in a histogram for an average subject, but vainly equalizes and flattens the histograms.

Color balance of the negative film also varies according to photographic exposure amount, film type, the light source for photography, color fading of the photographic image. Especially because each type of film is designed to provide an optimum color balance in combination with a particular recording material, a different combination can result in improper color balance and thus unsatisfactory reproduction quality. Moreover, according to the conventional color balance setting up method, reproduction conditions are determined for each image based on image data of each image, there can be color variance between the reproduced images.

SUMMARY OF THE INVENTION

In view of the foregoing, a prime object of the present invention is to provide a digital printer and a method of converting image data therefor, by which a high quality image can be reproduced with proper color balance in all density ranges from highlight through shadow points while considering gradation curves of the original, even if the original is under-exposed or over-exposed, and whatever type recording medium the original is.

To achieve the above object, according to a preferred embodiment of the present invention, characteristic value data of a reference film is stored in a first characteristic value memory, whereas characteristic value data of each type of recording media of the originals is stored in a second characteristic value memory, to produce a gradation balance conversion table from the first and second characteristic values. Image data of an original image is converted according to the gradation balance conversion table, so as to make the color balance proper in all density ranges from highlight through shadow points, even if the original image is under-exposed or over-exposed. The gradation balance converted image data is converted through an image data conversion device into recording data to record an image reproduced from the original.

Color balance of negative film in general varies depending upon film density. This is because characteristic curves or gradations of three colors, i.e., the curves of recording density of red (R), green (G) and blue (B) with respect to exposure amount, are not parallel to each other. The relationship between these non-parallel three color gradation curves may be referred to as gradation balance. The gradation balance is different between recording media types and film types. An optimum gradation balance can be determined based directly on a characteristic curve of a recording material for reproduction, and those of a reference film. The reference film may be a particular type of film that is the most suitable for use in combination with the recording material for reproduction, or an ideal film having an average characteristic curve.

According to another preferred embodiment of the invention, gradation curve data is stored in a gradation curve data memory, while image data of originals is accumulated for each type of recording media of the originals. Gradation balance data is derived from the accumulated image data of each media type, and a gradation conversion table is produced from the gradation curve data and the gradation balance data. An image data conversion table is produced from the gradation conversion table and an image recording amount obtained from an original, to convert image data of the original into recording data through the image data conversion table.

By accumulating image data of a plurality of images for each type of recording media, it becomes possible to obtain gradation balance data of the original which is not adversely affected by the individuality of the image, but represents the gradation balance of the recording medium of the original. Therefore, it is possible to convert the image data of the original to be suitable for the characteristic curve of the recording material for reproduction, so that color balance of the reproduced image will be proper in all density ranges from the highlight through shadow, even if the original is under-exposed or over-exposed.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
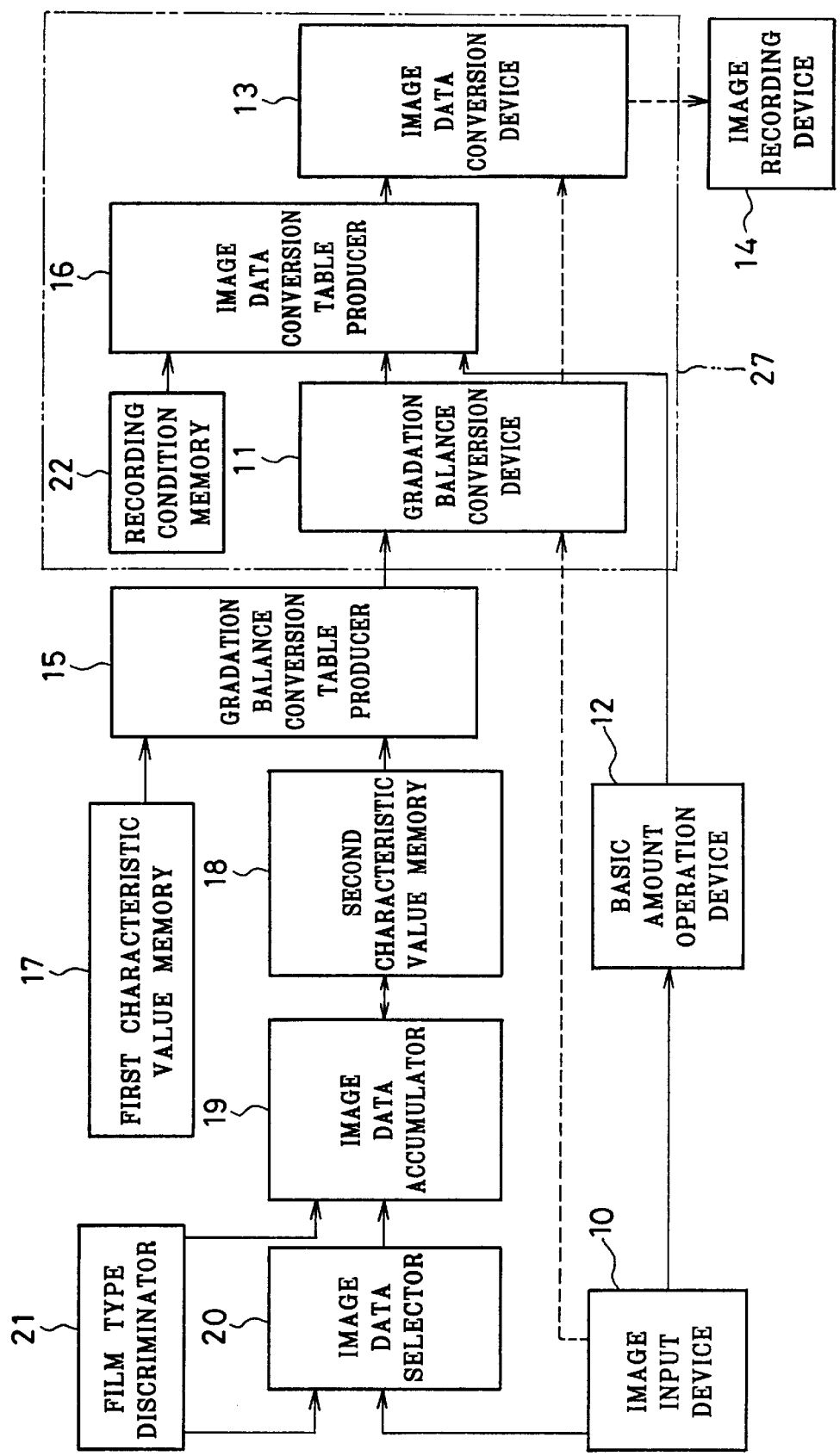
FIG. 1 is a functional block diagram of a digital printer according to an embodiment of the invention.

In FIG. 1, a digital printer is mainly constituted of an image input device 10, and an image recording device 14. A gradation balance conversion table producer 15 and an image data conversion table producer 16 are connected to the gradation balance conversion device 11 and the image data conversion device 13, to write a gradation balance conversion table and an image data conversion table in these devices 11 and 13, respectively.

The image input device 10 is a well-known film scanner which picks up each original image on a recording medium, e.g. on a negative film, and converts it to image data. The image input device 10 can be switched over between a main scanning mode and a pre-scanning mode. In the pre-scanning mode, the original image is picked up as thousands of pixels. The number of pixels for pre-scanning may vary from hundreds to tens of thousand depending upon requisite quality of print and processing speed. In the main scanning mode, the original image is picked up as hundreds of thousands to millions of pixels.

In FIG. 1, the flow of main scanning image data detected by main scanning is shown by dashed lines, while the flow of other data including pre-scanning image data detected by pre-scanning is shown by solid lines. The main scanning image data is sent from the image input device 10 to the gradation balance conversion device 11, to be converted into image data having a gradation balance corresponding to a reference film type as will be described in detail later. The pre-scanning image data is sent to an image data selector 20 and the basic amount operation device 12.

A first characteristic value memory 17 and a second characteristic value memory 18 are connected to the gradation balance conversion table producer 15. The first characteristic value memory 17 stores characteristic value data of a reference film. As described above, color balance of negative film in general varies depending upon film density. This is because characteristic curves or gradations of three colors, i.e., the curves of recording density of red (R), green (G) and blue (B) with respect to exposure amount, are not parallel to each other, and gradation balance indicates a relationship between these non-parallel three color gradation curves. The gradation balance is different between recording media types and film types. An optimum gradation balance can be determined based directly on a characteristic curve of a recording material for reproduction, and those of a reference film type.

The reference film type may be a specific type of negative film that is designed to be most suitable for use in combination with the recording material for reproduction, or an ideal film having average characteristics of a plurality of types of films. Hereinafter, the characteristics of the reference film type will be referred to as reference film characteristic values or first characteristic values as being stored in the first characteristic value memory 17. When the reference film characteristic values are detected from actual films of a particular type, it is possible to collect the reference film characteristic values while reading image data, or prepare and write the same previously in the first characteristic value memory 17. The second characteristic value memory 18 stores film characteristic values that are obtained from a great number of images in the same way as for the reference film characteristic values, but classified according to film types and media types. Hereinafter, the characteristic values stored in the second characteristic value memory 18 will be referred to as the second characteristic values.

Figure 2:
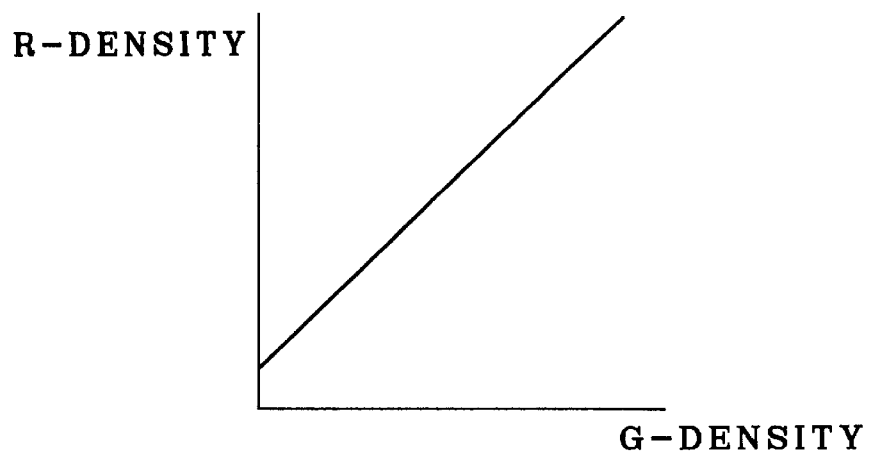
FIG. 2 is a graph illustrating an example of reference film characteristic curve stored in a first characteristic value memory.
Figure 3:
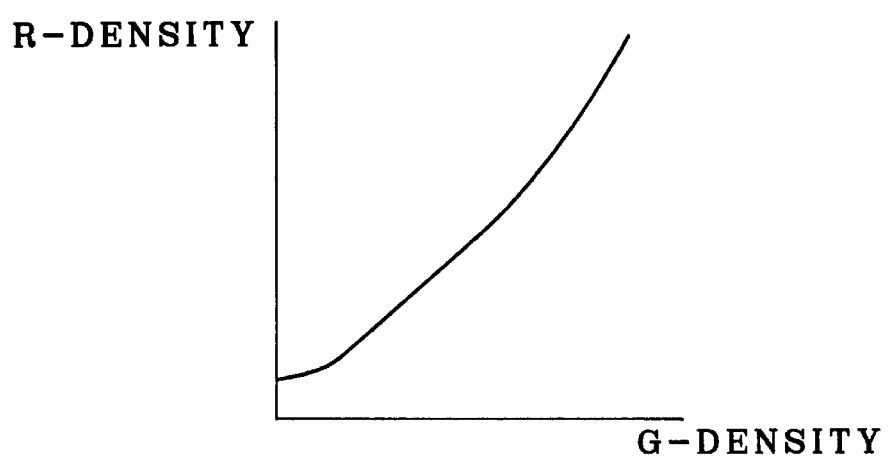
FIG. 3 is a graph illustrating an example of film characteristic curve of a particular film type stored in a second characteristic value memory.
Figure 4:
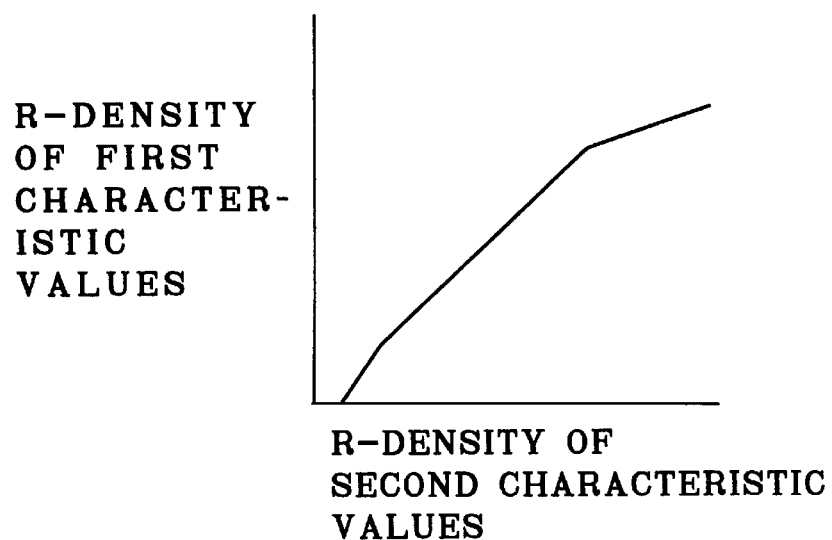
FIG. 4 is a graph illustrating an example of gradation balance conversion table representative of a relationship between the first characteristic values and the second characteristic values.

FIG. 2 shows an example of characteristic curve of the first characteristic values, and FIG. 3 shows an example of characteristic curve of the second characteristic values. Each curve shows the relationship between the green density and the red density. Based on these two curves, a gradation balance conversion table as shown in FIG. 4 can be obtained, which shows the relationship between the red density of the first characteristic value and that of the second characteristic value. With this gradation balance conversion table, red density data of the original image recorded on a particular film type can be converted into red density data according to the reference film type. In the same way, a characteristic curve showing the relationship between the green density and the blue density is formed from each of the first and second characteristic values, to produce a gradation balance conversion table representative of the relationship between the blue density of the first characteristic values and that of the second characteristic values. These conversion tables are written in a look-up table memory of the gradation balance conversion device 11. Converting the image data through the gradation balance conversion device 11 makes the color balance of the image data proper in highlight though shadow ranges for whatever type the recording medium of the original image is. If the color balance is proper, neutral gray is reproduced as neutral gray.

The second characteristic values are preferably derived from data of a great number of images, and to this end an image data accumulator 19 is connected before the second characteristic value memory 18. The image data accumulator 19 receives the pre-scanning image data from the image input device 10 through the image data selector 20. Also, a film type discriminator 21 is connected to the image data accumulator 19 to enter a film type signal representative of the type of medium of the original, such as the type of negative film on which the original image is recorded. The first and second characteristic values should not be limited to those shown in FIGS. 2 and 3, but may be any characteristic values if only these values are useful for producing a conversion table for correlating the first reference characteristic values with the second characteristic values obtained for each film type.

The film type discriminator 21 may be a bar code reader, a magnetic head or another kind of data reading device for reading bar code, magnetic data or the like from the recording media of the originals. The film type discriminator 21 may discriminate between a photographic film and another recording medium, between a negative film and a reversal film, as well as the name of film manufacturer and so forth. Needless to say, those original images successively recorded on the same photographic filmstrip, are considered to belong to the same film type.

The image data accumulator 19 accumulates red density data and blue density data with reference to green density data of the original images in individual memory locations. The memory location is designated according to the film type. Namely, according to the present embodiment, the green density is used as the standard for sorting the image data. Specifically, the level of the green density of each pixel of the image data is determined, and the red density and the blue density are accumulated according to the density level of the green density, wherein the density levels may be scaled by 0.01 to 0.1. The image data accumulator 19 also counts and stores the number of images whose data has been accumulated therein, so as to average the accumulated image data with the number of images. Based on the average image data, characteristic curves as the second characteristic values are provided, like the curve shown in FIG. 3. Instead of averaging the accumulated image data, it is possible to obtain a poly-dimensional functional equation through multiple regression analysis. When using the average, a consequent curve would be corrugated because it connects those points which plot the mean values. Therefore, it is desirable to correct the curve by applying a well-known smoothing treatment to these points. The image data accumulation is described in more detail in JPA 3-53235, for example. Averaging data of a great number of images will lead to a constant result that corresponds to or approximates to neutral gray. It is possible to convert the approximately neutral to neutral by adding appropriate correction values. Image data accumulation for each media type permits obtaining reliable image data specific to each individual media type, and the reliability increases with the number of images of the accumulated image data.

The image data selector 20 selects image data of those pixels which meet predetermined standards, and sends the selected image data to the image data accumulator 19. Specifically, the standard for selection is mean values of image data of a particular film type that are read from the image data accumulator 19 in correspondence with the film type signal from the film type discriminator 21. The image data selector 20 selects those pixels whose density values are included in a range around the mean values. In place of the mean values, statistically determined values such as those determined according to a method of least squares are usable. The image data selected in this way represents image densities of a limited subject color range around neutral gray. It is also preferable to define the pixel selection standards so as not to accumulate high chromatic image data, image data above a maximum reference density, and image data below a minimum reference density.

The image data conversion table producer 16 produces an image data conversion table for each color from the pre-scanning image data after being converted through the gradation balance conversion device 11, an image recording basic amount calculated by the basic amount operation device 12, and recording conditions from a recording condition memory 22. The recording condition memory 22 sets up parameters necessary for obtaining a proper image while taking account of mechanical differences between individual image input devices 10 and between individual image recording devices, as well as a characteristic curve of a recording material for lo reproduction. The image data conversion tables are written in a look-up table memory of the image data conversion device 13.

The basic amount operation device 12 calculates the image recording basic amount Dmi (i=R, G or B) based on the pre-scanning image data from the image input device 10. The image recording basic amount Dmi is a value determined for each original image based on image densities of each original image, i.e., a selected one or more of simple mean values of the pre-scanning image data calculated in each of predetermined areas of the scene, such as an entire area, a specified area, or selected areas. The image recording basic amount Dmi may also be mean values weighted according the pixel position, mean values of selected pixels, or weighted mean values of selected pixels.

The image recording basic amount Dmi may be determined according to any one of those known methods disclosed in JPA 55-26569, JPA 61-223731, JPA 2-90140, JPA 3-53235 and JPA 5-289207. The image recording basic amount Dmi may also be other values that characterize the original image, such as a weighted mean value of a maximum density or a highlight density and a minimum density or a shadow density, a weighted mean value of respective pixels, e.g. a weighted mean value obtained by weighting respective grades of the density histogram, or those values which correspond to a specified or selected frequency in an accumulated density histogram. Preferably, the image recording basic amount Dmi may be a value characterizing a main subject density or a value correlating with the main subject density, such as disclosed in JPA 5-100328. Density control values may be used as the image recording basic amount Dmi, which can be determined according a known method, for example, as disclosed in JPA 51-138435, JPA 53-145621, JPA 54-28131 and JPA 59-164547.

Figure 5:
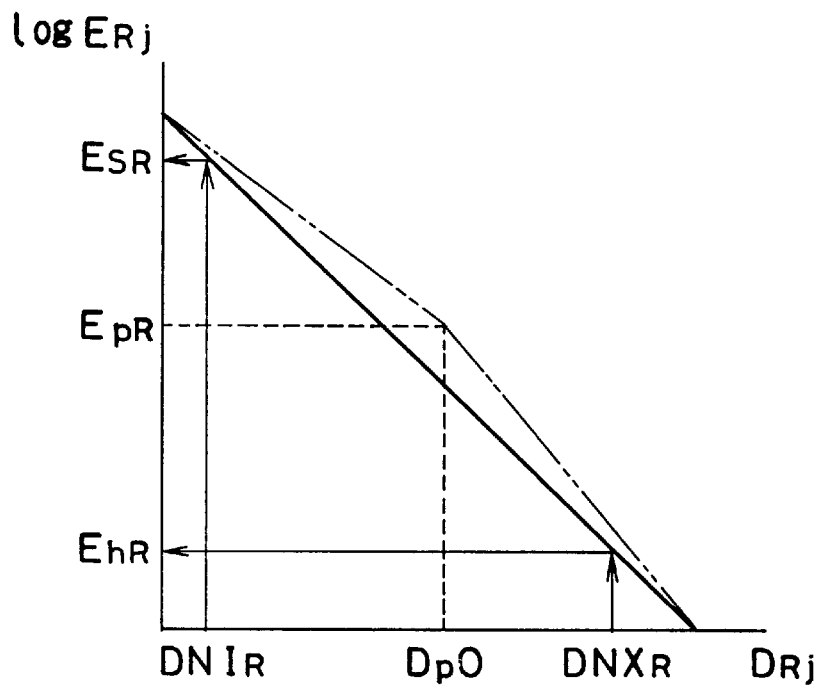
FIG. 5 is a graph illustrating an example of image data conversion table.

More specifically, the image data conversion table producer 16 produces the image data conversion table on the basis of the following equation which is adapted to convert the main scanning image data Dij into recording data "logEij" of each pixel for each color:

$$\text{logEij} = -ai \cdot \text{Dij} + \text{Dmi} + \Delta DC + bi$$

wherein
  Dij: main scanning data of each color (color density of each pixel);
  Dmi: image recording basic amount;
  $\Delta DC$: manual density or color correction value;
  ai,bi: coefficient (depending upon the recording material or image recording device);
  i: R, G or B
  j: pixel serial number FIG. 5 shows an example of conversion table for red produced on he basis of the above equation, wherein the horizontal axis represents the red density "D$_R$j" of the image data, whereas the vertical axis represents the recording data for red "logE$_R$j". It is to be noted that "DNI$_R$" and "DNX$_R$" represent a minimum average density and a maximum average density of the image data for red, respectively, whereas "logEs$_R$" and "logEh$_R$" represent a shadow level and a highlight level of the recording data for red, respectively. As for green and blue, similar conversion tables to that shown in FIG. 5 are produced based on the above equation, and these three conversion tables are written in the image data conversion device 13 for converting the image data into appropriate recording data. Since the three color balance of the image data has been adapted to the reference film type through the gradation balance conversion device 11, the image data conversion table determined for the reference film type can be used directly for any image data.

In FIG. 5, Dp0 represents a main subject density of the image data, and logEp$_R$ represents a recording data value necessary for recording the image with a proper main subject density. In order to obtain the recording data logEp$_R$ from the image data Dp0, the conversion table may be modified in the image data conversion table producer 16 in a manner as shown by chain-dotted lines in FIG. 5. The main subject density Dp0 of the original is derived from the pre-scanning image data converted through the gradation balance conversion device 11. To determine the main subject area in the original image, a known method of extracting a main subject or human face from the image data such as disclosed in JPA 52-156624, JPA 2-287531 and JPA 4-346332 is applicable. The recording data logEp$_R$ for the main subject density of the reproduced image is predetermined and stored in the recording condition memory 22.

Figure 6:
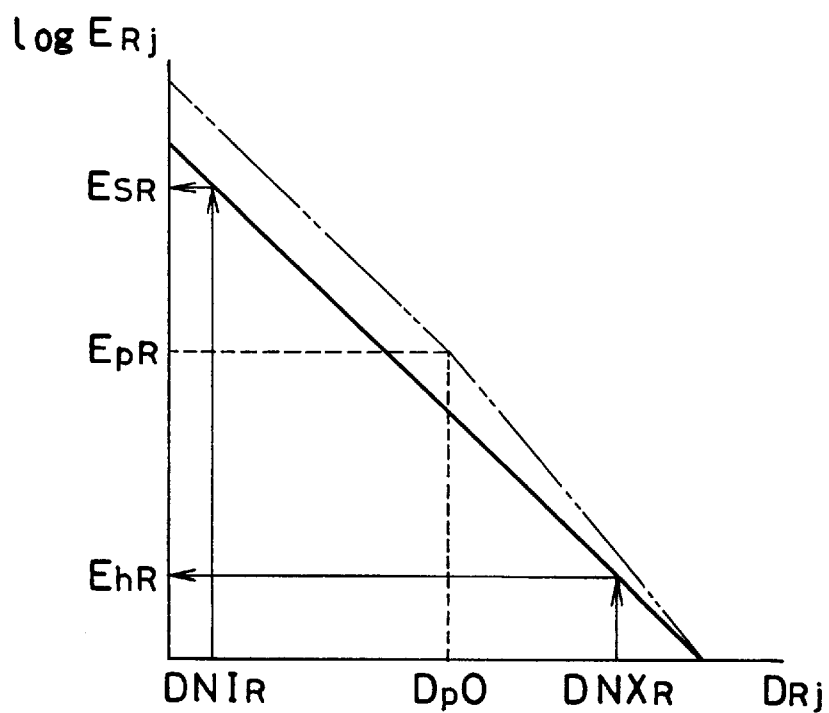
FIG. 6 is a graph illustrating another example of image data conversion table.

Although the modification of the conversion table shown by chain-dotted lines in FIG. 5 is concentrated in a range around the main subject density, it is alternatively possible to modify the curve also in the shadow range, while restraining the modification in the highlight range, as shown in FIG. 6, as the reproduction in the shadow range is not so important. For practical use, either of the modified curves should preferably be shaped into a continuous curve. In this way, the image data conversion table shown by solid lines in FIGS. 5 and 6, which is determined for the reference film type, may be modified depending upon the scene type of the original image, so as to correlate the recording data logEp$_R$ for main subject density with the main subject density Dp0 of the image data. The scene type of the original image is discriminated by use of a known method. For example, a great number of scenes are statistically classified into several categories according to patterns, and the original image is classified into one category depending upon its pattern determined based on the pre-scanning image data.

The image recording device converts the recording data from the image data conversion device 13 into image recording control amounts to record an image. It is possible to design the image data conversion device 13 to convert the main scanning image data directly into the image recording control amounts. The image recording device 14 may be a well-known video printer which scans a color photographic paper with light beams to sequentially expose the yellow, magenta and cyan photosensitive layers of the photographic paper.

Figure 7:
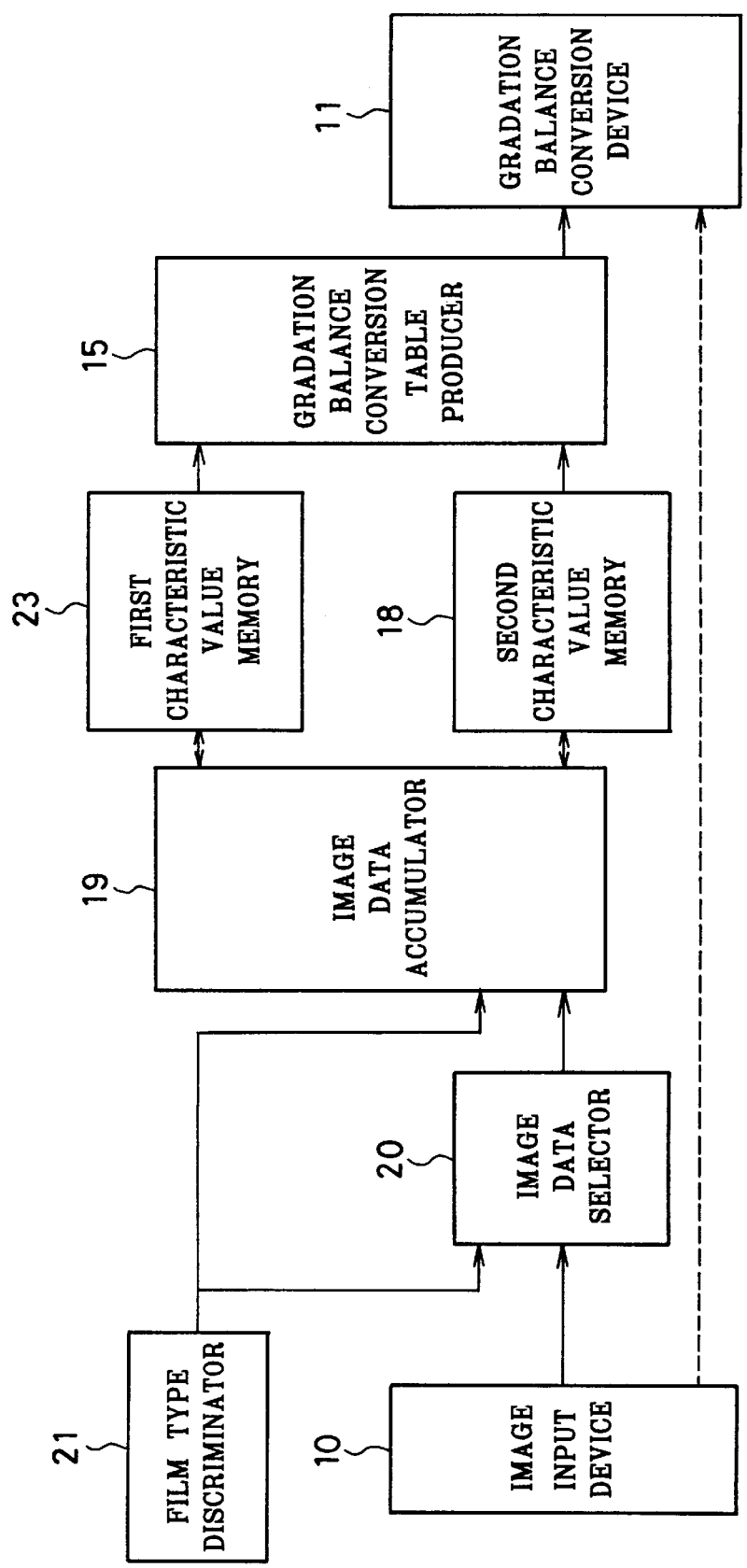
FIG. 7 is a functional block diagram illustrating a modification of the digital printer shown in FIG. 1.

It is possible to connect the image data accumulator 19 not only to the second characteristic value memory 18 but also to a first characteristic value memory 23, as shown in FIG. 7, so as to obtain first characteristic values from the accumulated image data in the same way as the second characteristic values. In that case, a reference film type is predetermined and is discriminated by the film type discriminator 21. As the first and second characteristic values, it is also possible to use those characteristic curves which represent relationships between densities of the original image and brightness levels of the subject.

The image data conversion table producer 16 may include several kinds of processing for media conversion to solve problems that may occur when making a hard copy from an image on photographic film, e.g. compression of lightness reproduction, hue, and chroma reproduction, or enhancement of particular color or highlight. In alternative, a processing device for media conversion may be provided in connection with the image data conversion table producer 16. It is also possible to add other conventional image processing steps, such as image enhancement, pseudo contour elimination, noise elimination, and calibration of mechanical tolerance or variance.

In the above described embodiment, the second characteristic values are obtained by accumulating and averaging pre-scanning image data for each film type. It is alternatively possible to pre-scan at once a plurality of images of the same recording medium as the original image to be printed, to use as pre-scanning data for determining second characteristic values. The pre-scanned images may be all image frames on a photographic filmstrip, or similar image frames on the filmstrip. The similarity between the image frames can be detected by statistic analysis of image data, discrimination of photographic light source, or magnetic data recorded on the film.

For the pre-scanning and the main scanning, a single photometric device may be used commonly, or it is possible to provide separate photometric devices. When using the same photometric device, it is alternatively possible to obtain the pre-scanning image data from the main scanning image data through a pixel density conversion, i.e., by compounding image data of a plurality of pixels to reduce the number of pixels down to hundreds through hundreds thousand.

Figure 8:
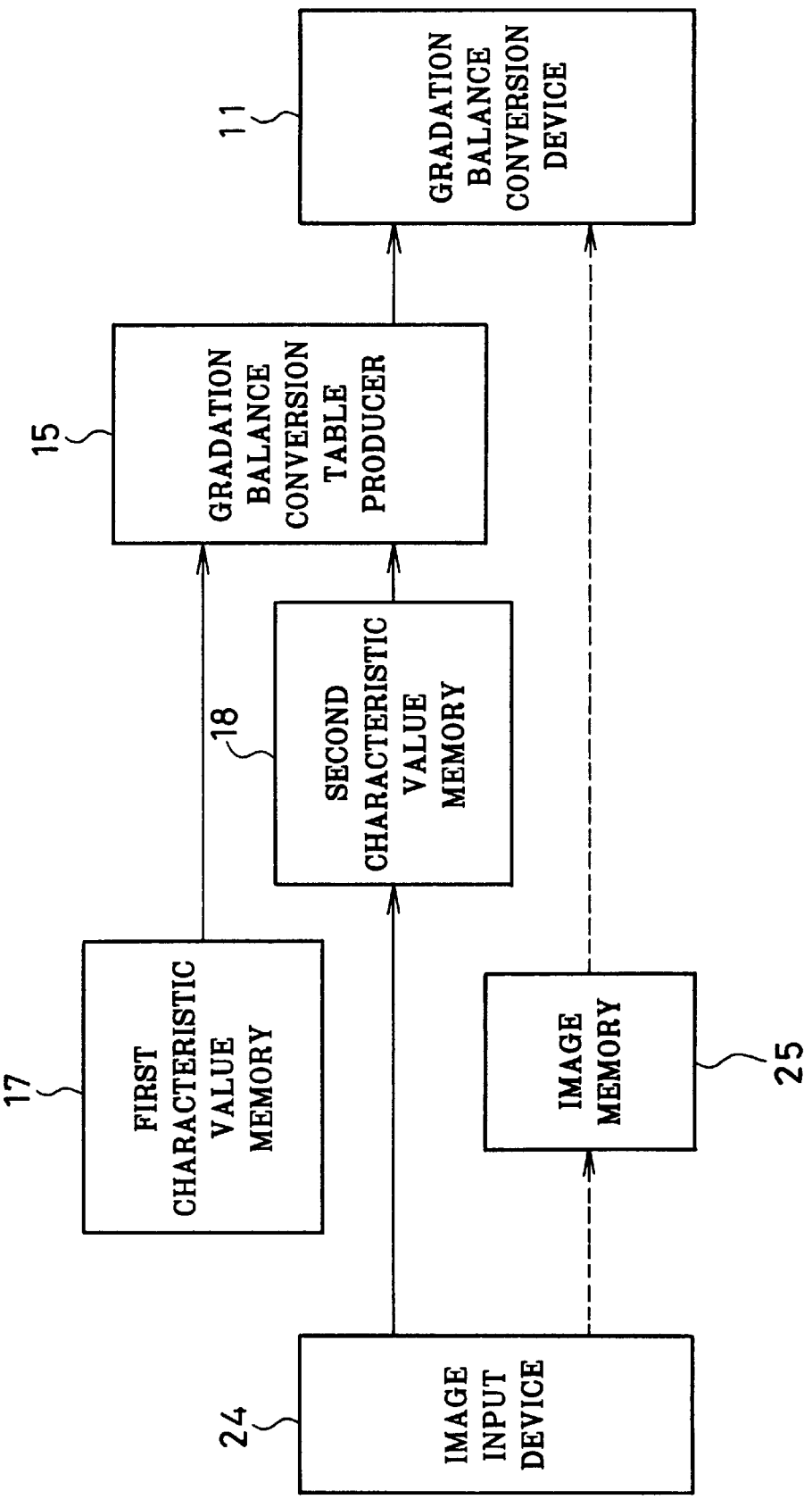
FIG. 8 is a functional block diagram illustrating a digital printer according to another embodiment of the invention.

Alternatively, it is possible to simultaneously pick up image data of a plurality of images in the main scanning mode, and obtain the pre-scanning image data from the main scanning image data by changing pixel density. FIG. 8 shows an embodiment for this method, wherein main scanning image data picked up by an image input device 24 from a plurality of images is stored in an image memory 25. Pre-scanning image data is obtained from the main scanning image data through a pixel density conversion or the like. A second characteristic value memory 18 derives second characteristic values from the pre-scanning image data of the plurality of images. After a gradation balance conversion table produced in a gradation balance conversion table producer is written in a gradation balance conversion device 11, the main scanning image data is read from the image data memory 25 frame after frame to be converted into recording data.

In the above described embodiment, the gradation balance conversion table producer 15 derives a first conversion condition, $a=f(x)$, from the first and second characteristic values, and the image data conversion table producer 16 produces a second conversion condition, $y=g(a)$, taking the image recording basic amount, the recording conditions and so forth into account. Then, the first and second conversion conditions are written in the conversion devices 11 and 13. However, it is possible to combine these two conversion processes together, $y=g(f(x))$, to use a single conversion table. In that case, those elements bounded with chain-dotted lines in FIG. 1 may be integrated in a single conversion device 27.

The second characteristic value may also be derived from image density data detected from developed image of a test image having a predetermined pattern of different density segments. The test image may be exposed on a leading area of a photographic filmstrip. It is also possible to omit the film type discriminator 21, the image data selector 20 and the image data accumulator 19, and write the second characteristic value memory 18 with second characteristic values previously determined by a separate device.

As described so far, according to the above embodiments, a recording medium whose color balance is most suitable for the recording material for recording the reproduced image is selected as the reference film type, and image data of any types of recording media is converted to have the same color balance as the reference film type, it is possible to reproduce images with proper color balance in all density ranges from highlight through shadow, independently of the quality of the original image and the media type of the original. That is, gray is reproduced as gray in all density ranges.

Figure 9:
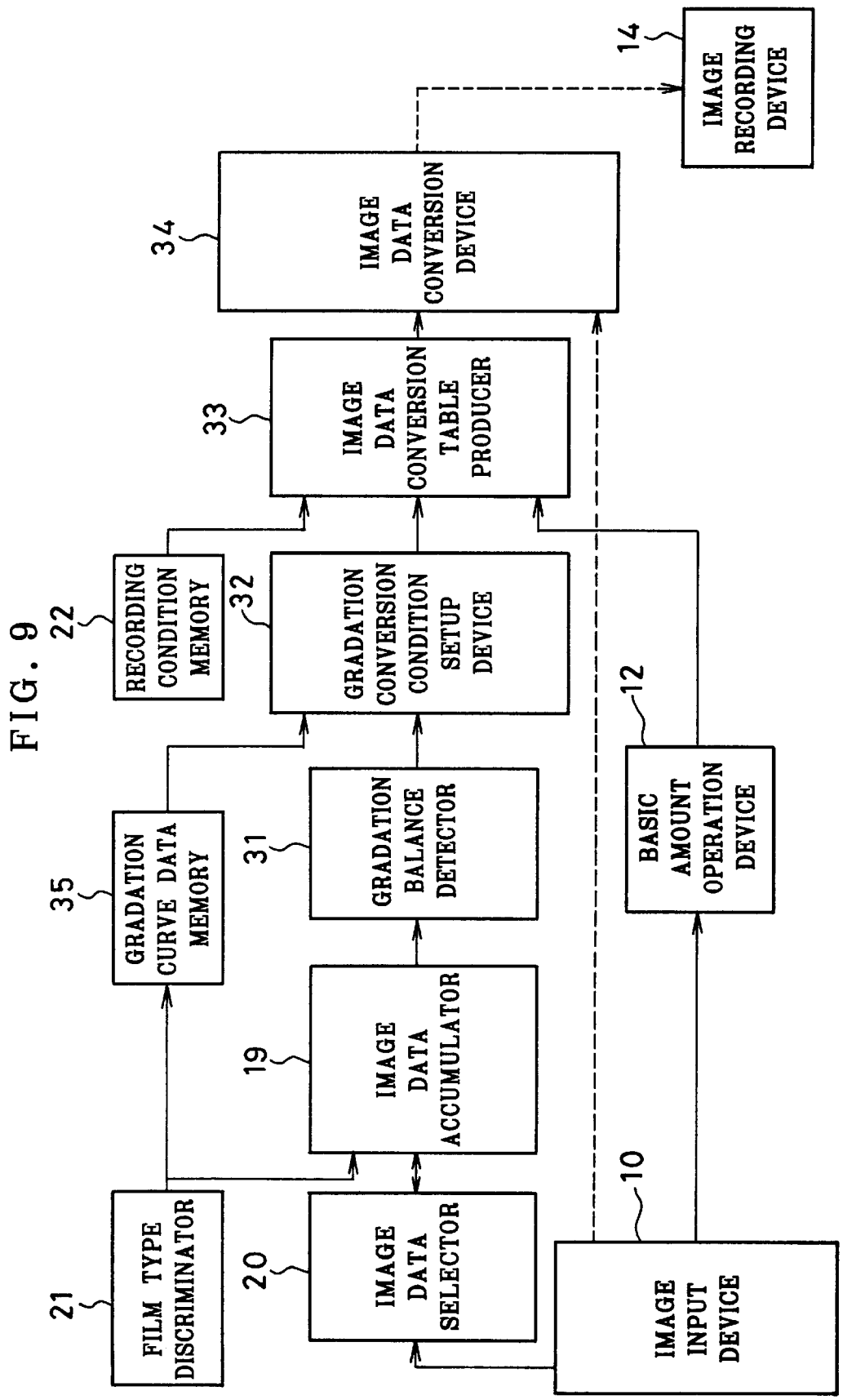
FIG. 9 is a functional block diagram illustrating a digital printer according to a further embodiment of the invention.

FIG. 9 shows a digital printer according to another embodiment of the present invention, which is mainly constituted of an image input device 10, a basic amount operation device 12, an image recording device 14, a gradation balance detector 31, a gradation conversion data setup device 32, an image data conversion table producer 33, an image data conversion device 34, and a gradation curve data memory 35.

The image input device 10, the basic amount operation device 12, and the image recording device 14 operate in the same way as those devices which are designated by the same reference numbers in the above described embodiments. Also in FIG. 9, the flow of pre-scanning image data detected through the image input device 10 is shown by solid lines, whereas the flow of main scanning data is shown by dashed lines. In this embodiment, the main scanning image data is sent directly to the image data conversion device 34. It is possible for this embodiment to obtain the pre-scanning image data from the main scanning data by the image data compression or pixel number reduction.

Figure 10:
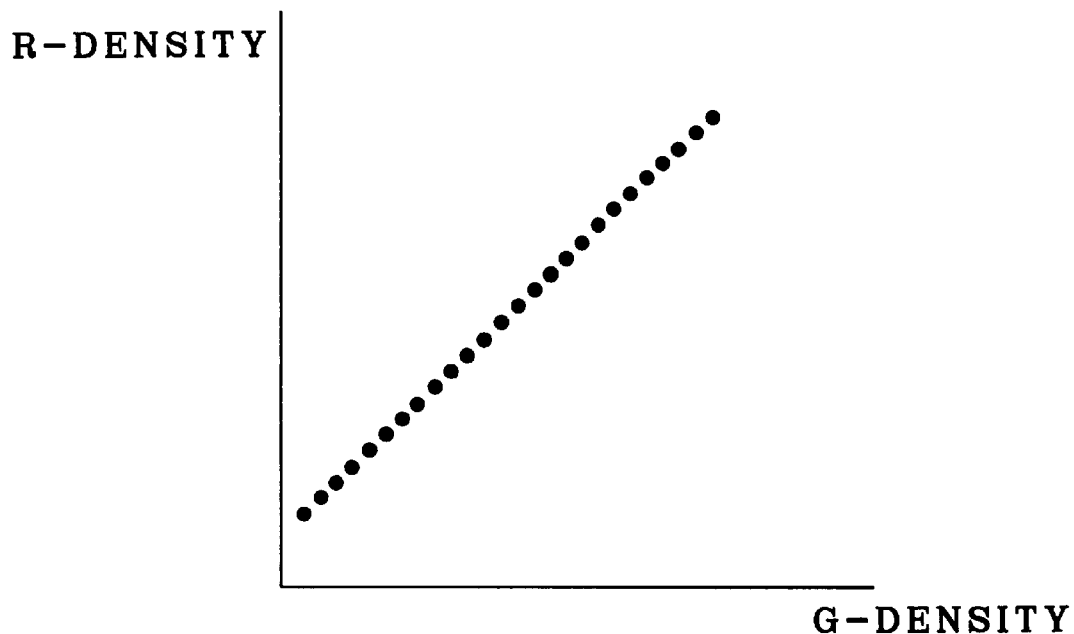
FIG. 10 is a graph illustrating an example of gradation balance data.
Figure 11:
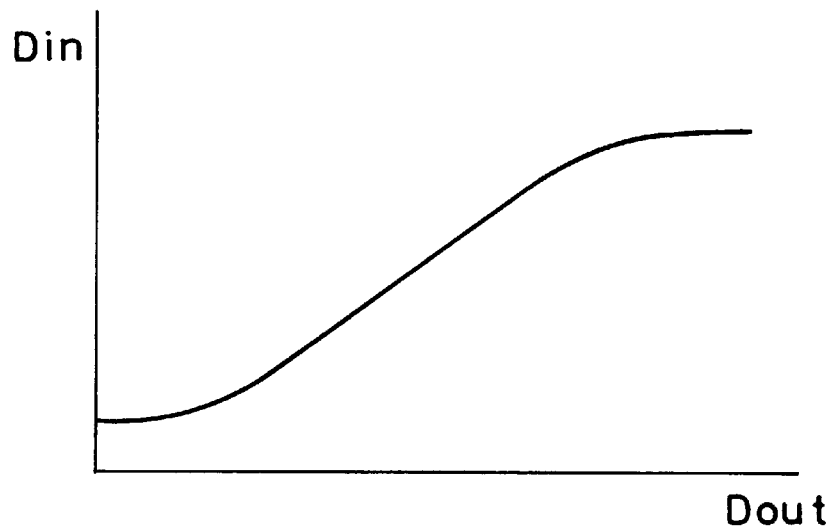
FIG. 11 is a graph illustrating an example of gradation curve data.

An image data conversion table for converting the main scanning image data into recording data is produced by the image data conversion table producer 33 based on gradation conversion data and an image recording basic amount, and is written in a look-up table memory of the image data conversion device 34. The image recording basic amount is determined by the basic amount operation device 12. The gradation conversion data is constituted of gradation balance data as shown in FIG. 10 and gradation curve data as shown in FIG. 11. The gradation balance data represents color balance of each density level, while the gradation curve data represents the gradient that corresponds to the inclination of the characteristic curve of a photosensitive material. Separating the gradation balance from the gradation curve or gradient makes it possible to utilize a gradation balance mean value of a great number of images. The gradation curve need not be so precise as the gradation balance data, so that it is possible to use predetermined data as the gradation curve data. The gradation curve data is written for each type of recording media in the gradation curve data memory 35, and is selected in response to a media type signal from the film type discriminator 21. The selected gradation curve data is sent to the gradation conversion condition setup device 32. However, it is possible to use common gradation curve data regardless of media type.

Figure 19:
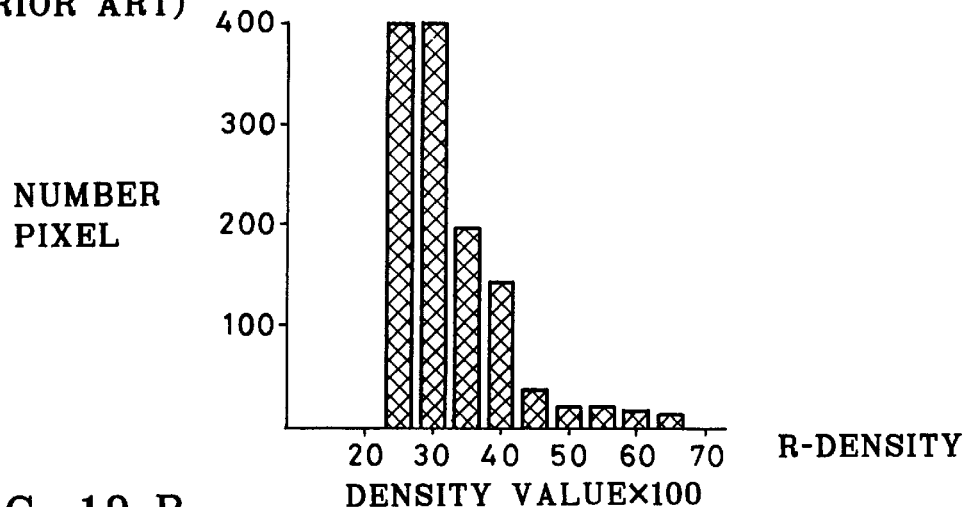
FIGS. 19A, 19B and 19C are density histograms for red relating respectively to under-exposed, properly exposed and over-exposed images of the same subject photographed on the same negative film.
Figure 19:
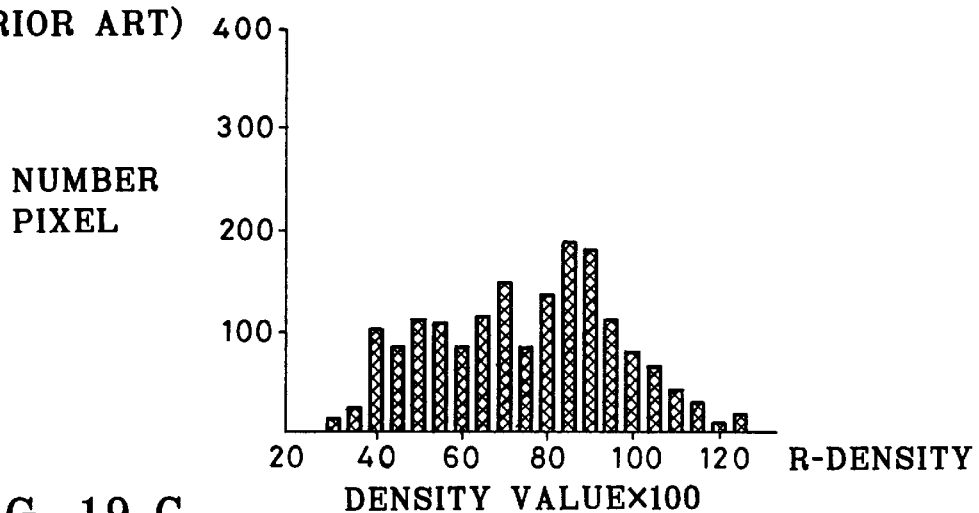
Figure 19:
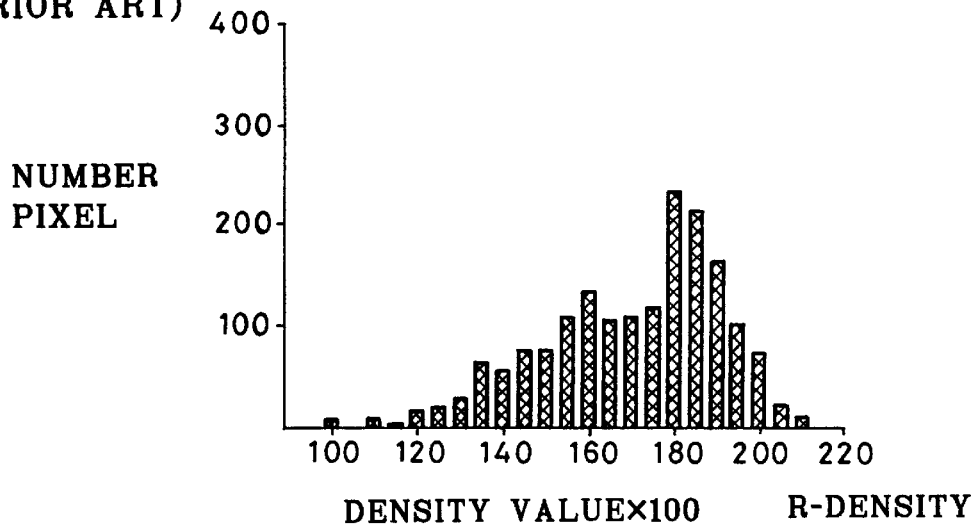

The gradation balance data is detected by the gradation balance detector 31. As described above, the balance of three color densities of a color negative photographic film vary depending upon film density, and the gradation balance varies depending upon the type of recording media. It is known in the art to previously store color balance data of various film types, or to derive color balance from a single image. However, there is a limit in accuracy of these methods, because color balance derived from maximum three color densities or density values according to the maximum densities of a single image can differ from that derived from another image even if the two images are recorded on the same type medium, as shown for example in FIGS. 19A to 19C. To solve this problem, an image data accumulator 19 is connected to the gradation balance detector 31, and an image data selector 20 selects the pre-scanning image data in accordance with a media type signal from a film type discriminator 21, to send the selected image data to the image data accumulator 19. The image data selector 20, the film type discriminator 21, and the image data accumulator 19 operate in the same way as described with respect to the embodiment of FIG. 1. Accumulating image data according to media type permits obtaining image data specific to each type of recording media with increasing reliability, as the number of images of the accumulated data increases.

Figure 12:
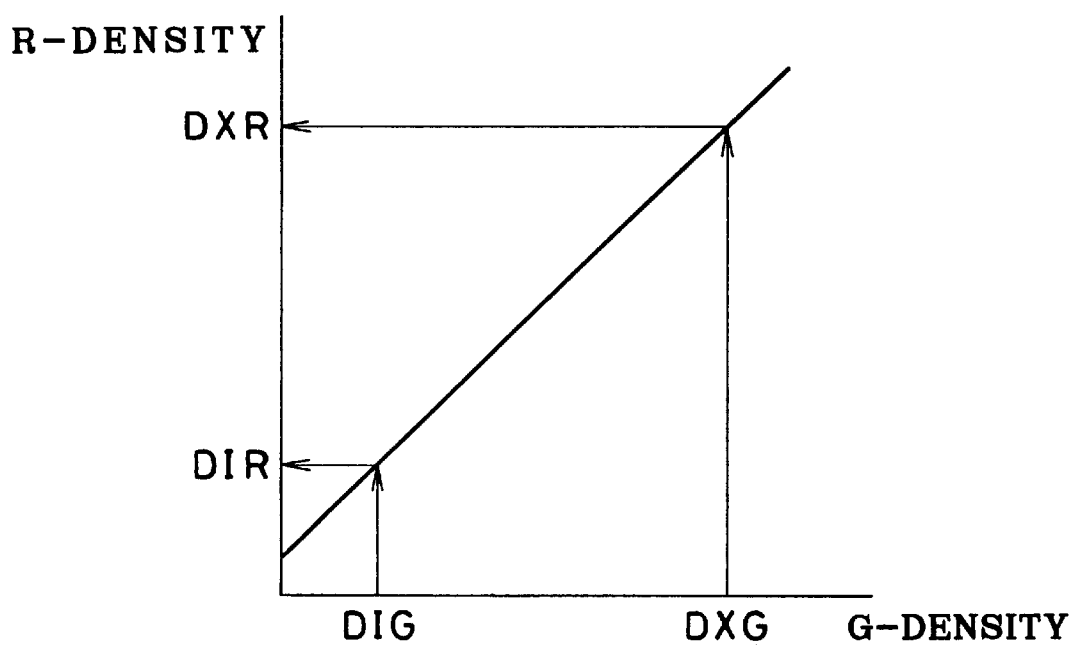
FIG. 12 is a graph illustrating a process of obtaining high-density and low-density reference balance values from the gradation balance data of FIG. 10.

The gradation balance detector 31 derives gradation balance data from image data mean values obtained in the image data accumulator 19 by averaging the accumulated image data for each media type. FIG. 10 shows an example of gradation balance data which shows red density mean values of the accumulated image data in relation to the green density levels. The gradation balance data consisting of a plurality of points is subjected to a well-known smoothing process, to be modified as a continuous straight line or smooth curve as shown in FIG. 12. In the same way, a curve of gradation balance data representative of a relationship between blue density and green density of the accumulated image data is produced.

The gradation conversion condition setup device 32 produces a gradation conversion table based on the gradation curve data from the gradation curve data memory 35 and the gradation balance data from the gradation balance detector 31. First, a mean value of maximum densities of three colors of the original image is determined as a high-density reference value "DXG" for green, and a red density "DXR" is determined in association with the reference value DXG according to the gradation balance curve of red relating to green, as is shown in FIG. 12. Also, a blue density "DXB" is determined in association with the reference value DXG according to the gradation balance curve of blue relating to green. These values DXR and DXB are red and blue densities for obtaining neutral gray in combination with the green density DXG as the high-density reference value. Therefore, these three values DXG, DXR and DXB will be referred to as high-density reference balance values "DXi", wherein i=R, G or B. In the same way, a mean value of minimum densities of three colors of the original image is determined as a low-density reference value "DIG" for green, to determine red and blue densities "DIR" and "DIB" for obtaining neutral gray in combination with the green density DIG. These three values DIG, DIR and DIB will be referred to as low-density reference balance values "DIi".

Although three color mean values are used as the high-density reference value and the low-density reference value values in the present embodiment, it is possible to use respective color densities corresponding to a maximum density and a minimum density.

Figure 13:
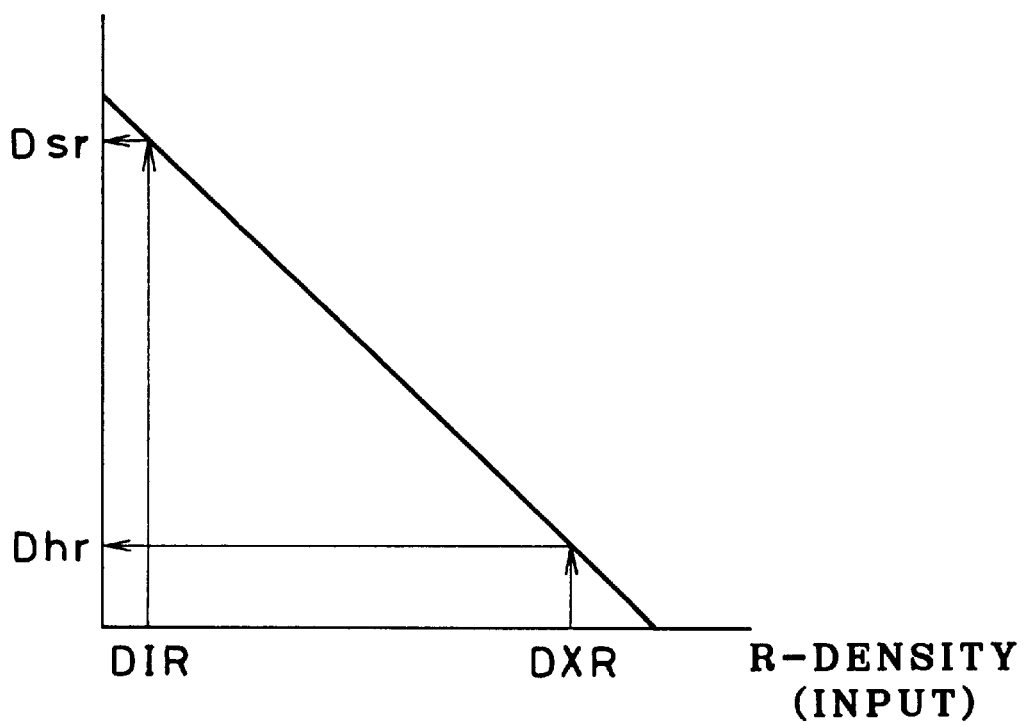
FIG. 13 is a graph illustrating an example of gradation balance conversion table.

The gradation balance conversion table is produced for each color by connecting two coordinate points (DXi, Dhi) and (DIi, Dsi) which are defined by the high-density reference balance value DXi and a highlight recording density "Dhi" predetermined for each color, and the low-density reference balance value DIi and a shadow recording densities "Dsi" predetermined for each color, respectively. FIG. 13 shows an example of the gradation balance conversion table for red. In FIG. 13, Dhr and Dsr represent a highlight level and a shadow level of the recording data for red corresponding to the high-density and low-density reference values DXR and DIR of the image data for red. It is possible to store the highlight and shadow levels Dhi and Dsi, i=R, G or B, of each color in the recording condition memory 22, and revise them automatically or manually according to the scene type or preference.

Since the gradation balance conversion table as shown in FIG. 13 equally converts half-tone image densities into recording densities between the predetermined highlight and shadow densities, under-exposed negative images would not always be reproduced with a natural tone reproduction. For this reason, the gradation balance conversion table is modified with the gradation curve data from the gradation curve data memory 35, to be a gradation conversion table.

As described above, the gradation curve data is written for each type of recording media in the gradation curve data memory 35, and is selected in response to the film type signal from the film type discriminator 21. The gradation curve data is a conversion table that corresponds to the characteristic curve of a photographic recording medium, and converts input data "Din" into output data "Dout". As shown in FIG. 11, the toe and shoulder of the curve are not proportional, but the image density is compressed in these ranges. The gradation curve varies depending upon the type of recording media or photosensitive layers. Thanks to the latitude of the photographic film and the improved exposure technic of the cameras, the shoulder range is rarely utilized. Because the toe range of the curve has a similar shape to one another, it is unnecessary to store a color specific conversion table to each color, but a generic conversion table is enough. To obtain an exact gradation curve, it is possible to use film densities measured for each type of photographic films. It is alternatively possible to select one of experimentally determined conversion tables as gradation curve data. It is also possible to use functional equations representative of the characteristic curves in place of the conversion tables.

Figure 14:
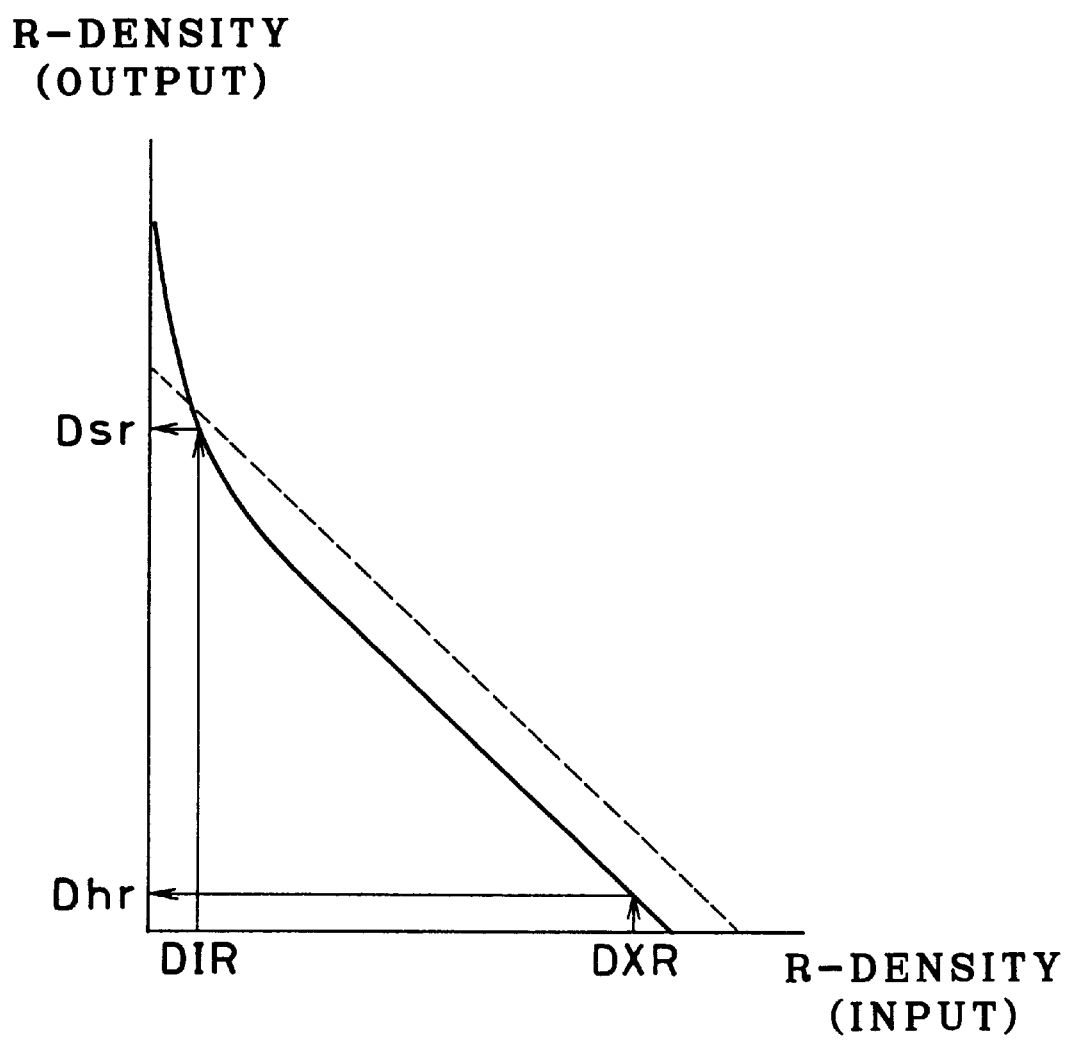
FIG. 14 is a graph illustrating an example of gradation conversion table.

The gradation conversion condition setup device 32 determines an effective range of the gradation curve data based on the high-density reference balance value DXi and the low-density reference balance value DIi of the original, and composes the gradation curve data of the determined effective range with the gradation balance conversion table as shown in FIG. 13, to produce a gradation conversion table. Specifically, the input data shown by the horizontal axis of the gradation balance conversion table is replaced by the values shown by the vertical axis of the corresponding characteristic curve. A curve shown by a solid line in FIG. 14 shows an example of a gradation conversion table for an under-exposed original image. In comparison with a gradation conversion table for a properly exposed original image, which is shown by dashed lines in FIG. 14 and corresponds to the gradation balance conversion table shown in FIG. 13, the contrast of the solid line curve, i.e. the difference between DXi and DIi, is reduced, so that the reproduced image could be unsharpened in the shadow range. But the tone reproduction would be improved in totality because the low-density range of the original image is enlarged in the recording density.

As an alternative, the same effect is achieved by converting respective values from DIR through DXR of the horizontal axis of FIG. 13, according to the conversion table from Din into Dout of FIG. 11, to produce a gradation conversion table. This modification of the gradation balance conversion table into the gradation conversion table may be carried out for each image, or it is possible to store a plurality of modified conversion tables to select. As the gradation curve data does not require a high accuracy, it is also possible to automatically determine the gradation curve data by a conventional method. For example, a density histogram or density accumulated distribution automatically determined from the pre-scanning data of the original image may be used as the gradation curve data.

As described so far, according to the present embodiment, color balance of each type of recording media including non-linear ranges of its characteristic curve is automatically determined based on the image data selected through the image data selector 20, the image data accumulator 19 and the gradation balance detector 31, and the color balance is controlled. Although there are differences in the tone range between the characteristic curves of the different media types, the differences have influence on tone reproduction, but have little influence on color balance. Since the color balance due to the differences in the tone range is corrected, the influence on tone reproduction is reduced. Although it is difficult to automatically determine the shape of characteristic curve of each type of recording media from the image data, the gradation curve data can be predetermined average data, because the gradation curve data need not so accurate as the color balance data.

The image conversion table producer 33 modifies the gradation conversion table from the gradation conversion condition setup device 32 on the basis of recording conditions from a recording condition memory 22 and the image recording basic amount from the basic amount operation device 12. The modified gradation conversion table is written as an image data conversion table in the image data conversion device 34. Examples of modified gradation conversion tables are shown by chain-dotted lines in FIGS. 15 and 16.

The reason for modifying the gradation conversion table based on the image recording basic amount is as set forth below. If the maximum and minimum reference values to be reproduced, or the highlight and shadow points are correct, there is no need for modification with the image recording basic amount. A typical example of those scenes whose maximum and minimum reference values are correct is a portrait photographed in a studio by a professional photographer. In that case, the highlight point may correspond to a white shirt, and the shadow point may correspond to black hairs. On the contrary, in those scenes which are taken with landscapes in the backgrounds, there may be many subjects that are considered to be highlight points, such as bright sky or clouds, white walls, the outdoors viewed through the window, a near object that reflects flash light. Since it is hard to extract the correct highlight point, such as a white shirt, from those scenes, the modification based on the image recording basic amount is necessary in most cases.

To determine the main subject area in the original image, a known method of extracting a main subject or human face from the image data such as disclosed in JPA 52-156624, JPA 2-287531 and JPA 4-346332 is applicable. The recording data Dpr for the main subject density of the reproduced image is predetermined for each type of recording media, and stored in the recording condition memory 22.

Figure 15:
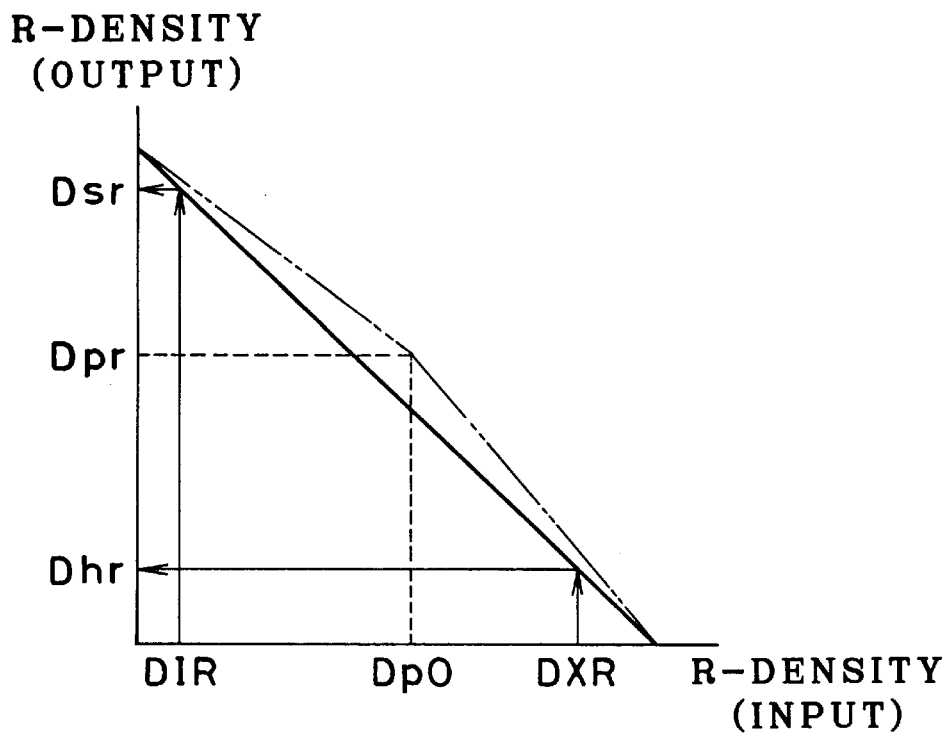
FIG. 15 is a graph illustrating an example of modified gradation conversion table used as an image data conversion table.
Figure 16:
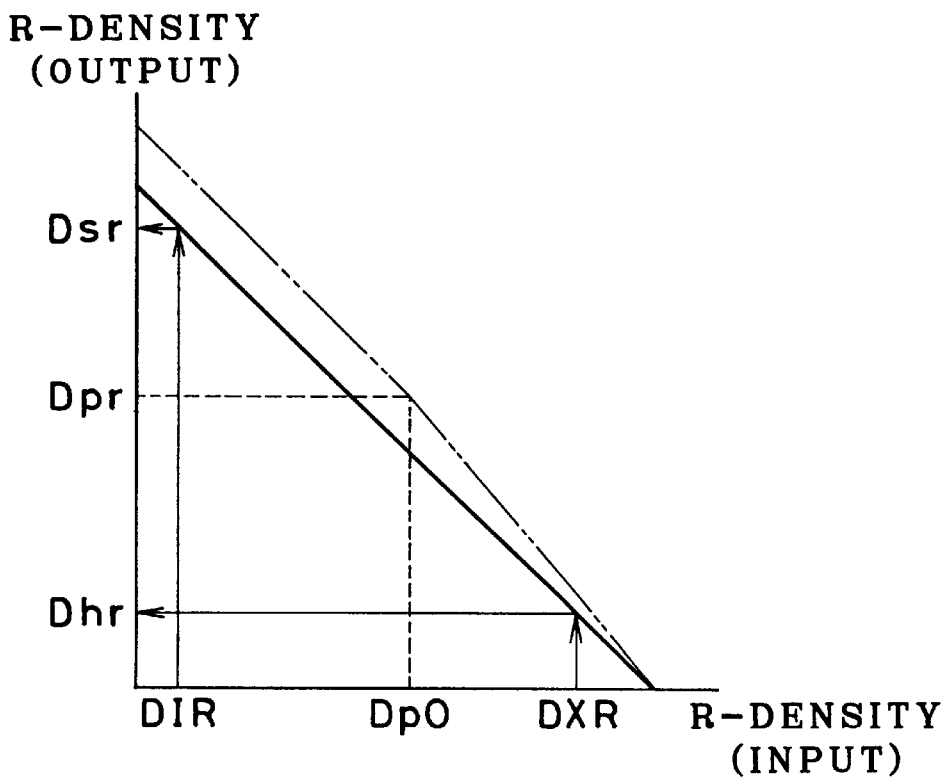
FIG. 16 is a graph illustrating another example of modified gradation conversion table used as an image data conversion table.

Although the modification of the conversion table shown by chain-dotted lines in FIG. 15 is concentrated in a range around the main subject density, it is alternatively possible to modify the curve also in the shadow range, while restraining the change of the curve in the highlight range, as shown in FIG. 16, as the reproduction in the shadow range is not so important. A modification method as disclosed in JPA 4-285933 may also be applicable. For practical use, either of the modified curves should preferably be shaped into a smooth curve. In this way, the image data conversion table shown by solid lines in FIGS. 15 and 16, which is determined based on the gradation data and the recording conditions, may be modified depending upon the scene type of the original image, so that the main subject density Dp0 of the image data of the original may be associated with the recording data Dpr for a proper main subject density. The scene type of the original image is discriminated by use of a known method. For example, a great number of scenes are statistically classified into several categories according to patterns, and the original image is classified into one category depending upon its pattern determined based on the pre-scanning image data. It is also possible to use photographic data therefor as disclosed in JPA 4-284442. It is to be noted that the modification of the gradation conversion table based on the image recording basic amount is effected on the gradation conversion table that is adapted to an actual original image, e.g. an under-exposed image as shown in FIG. 14, though the examples of FIGS. 15 and 16 show the modifications effected on the reference or standard gradation conversion table adapted to a properly exposed original.

Figure 17:
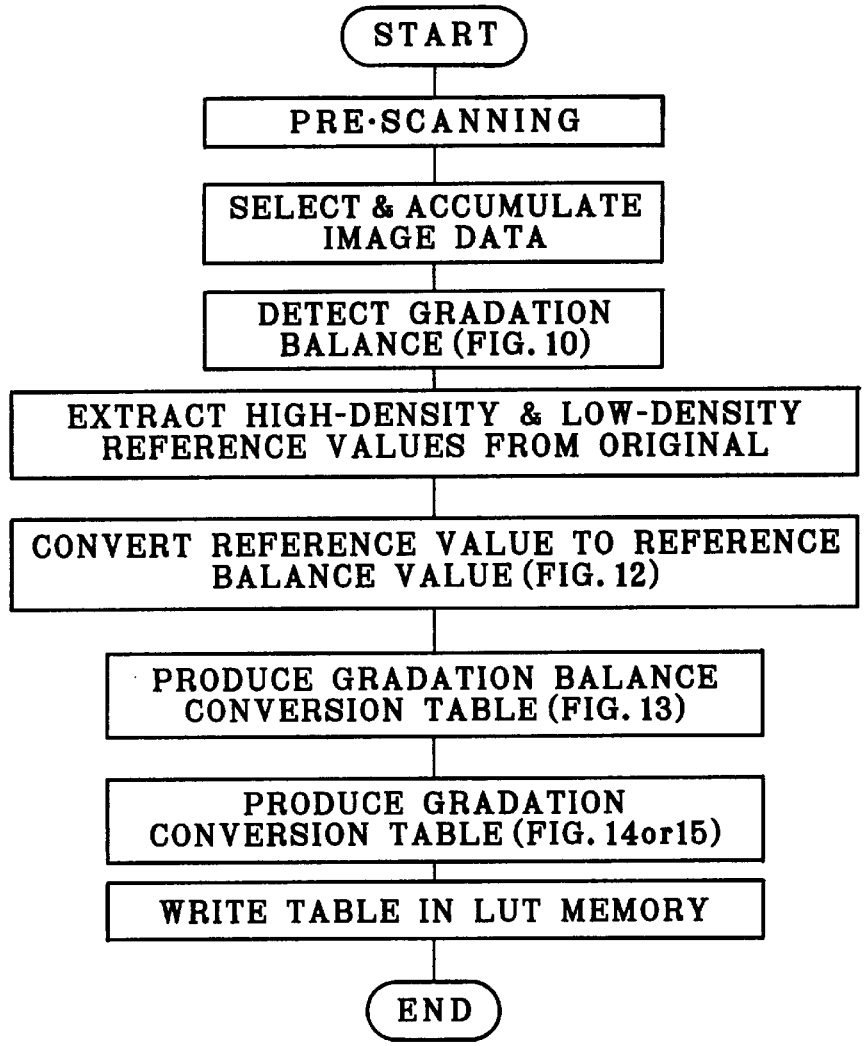
FIG. 17A is a flow chart illustrating a sequence of producing an image data conversion table from image data detected by pre-scanning.
FIG. 17B is a flow chart illustrating a sequence of recording an image based on image data detected by main scanning.
Figure 17:
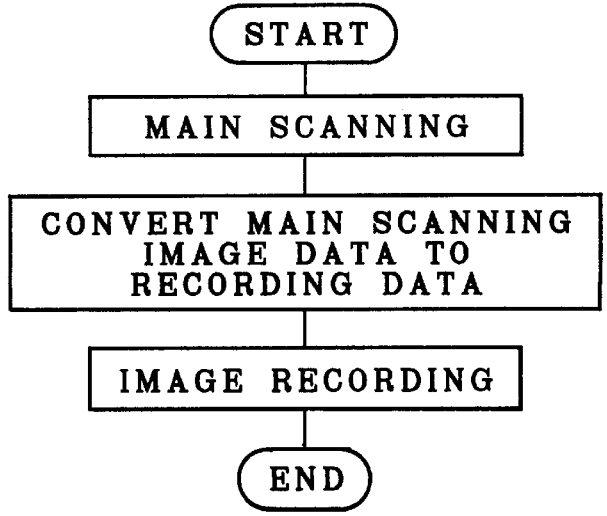

FIG. 17A shows the sequence of producing the gradation conversion table on the basis of pre-scanning data. FIG. 17B shows the sequence of converting main scanning data into recording data to record an image.

Instead of producing a gradation conversion table from the gradation curve data and the gradation balance conversion table as above, it is possible to produce an image data conversion table from the gradation curve data and the image recording basic amount. Thus, various combinations of conversion tables, or separation or integration of conversion tables are possible in accordance with correction factors, without departing from the scope of the invention.

Figure 18:
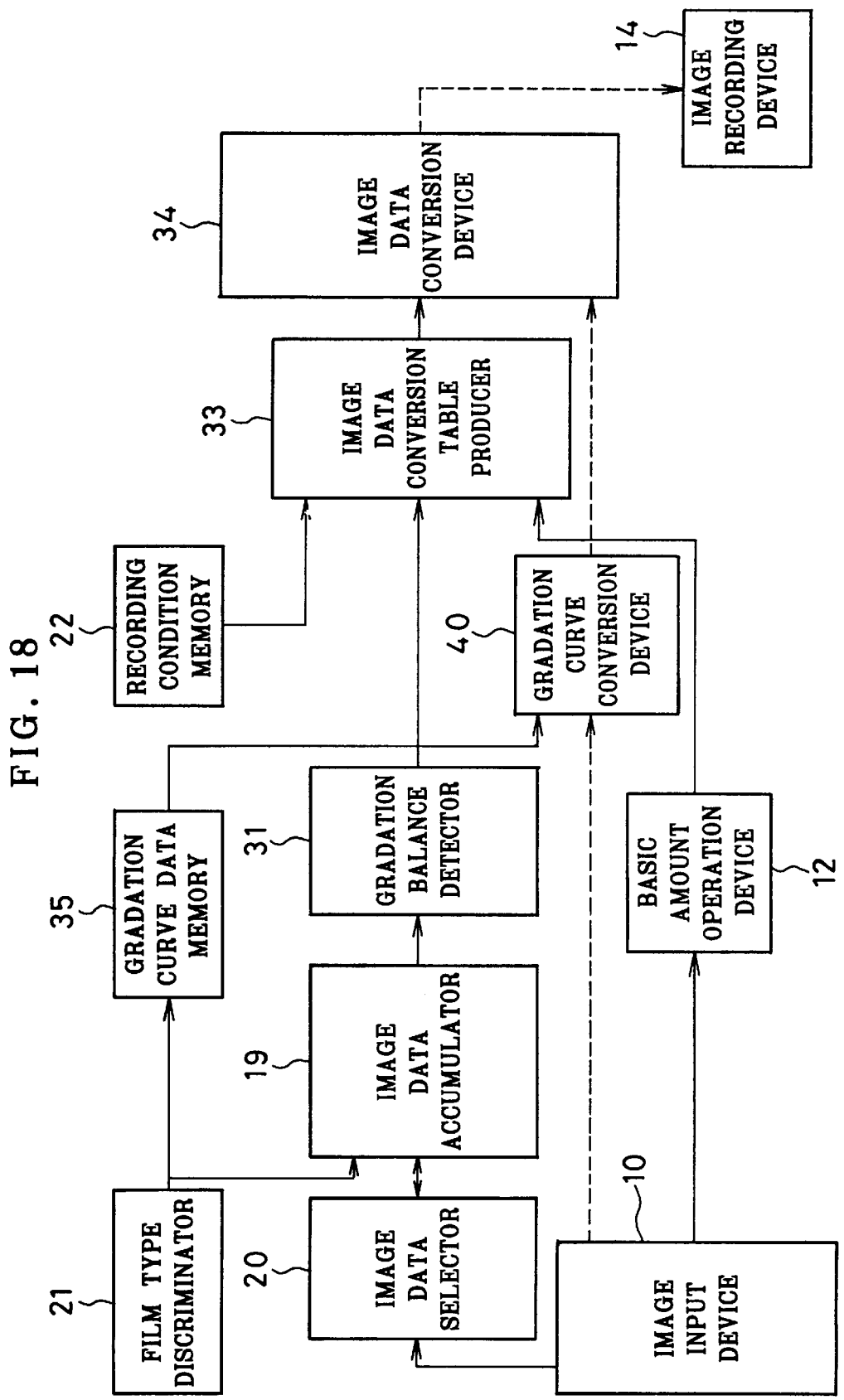
FIG. 18 is a functional block diagram illustrating a digital printer according to still another embodiment of the invention.

For example, it is possible to provide a gradation curve conversion device 40, as shown in FIG. 18, to convert main scanning image data based on the gradation curve data so as to eliminate non-linearity of the photographic films. Thereafter, the main scanning image data is converted into recording data through the image data conversion device 34. In that case, an image data conversion table is produced based on the gradation balance conversion table and the image recording basic amount. The gradation curve conversion device 40 eliminates only non-linearity of the photographic films from the main scanning image data, not corrects the gradation balance of the characteristic curves. According to the present invention, the gradation curve data is not used to correct the gradation balance or color balance, but is representative data.

In this way, according to the present embodiment, the three color gradation balance that requires accuracy is modified separately from the gradation curve that need not be so accurate, so as to produce an image data conversion table from standard or representative gradation curve data and optimized three color balance data for the image recording device. Therefore, it is possible to reproduce high quality images having superior gradation and color balance from under-exposed through over-exposed original images.

In the embodiment of FIG. 9, high-density reference balance values DXi and low-density reference balance values DIi are determined as those values which correspond three color densities of neutral gray at the high-density reference value and the low-density reference value of the original image. However, in place of these reference balance values DXi and DIi, it is possible to use weighted mean values DNXi and DNIi which are determined according to the following equations:

$$DNXi = KXi \cdot DXi + Kxi \cdot Dxi + \alpha i$$

$$DNIi = KIi \cdot DIi + Kni \cdot Dni + \beta i$$

wherein

KXi, Kxi, KIi, Kni: coefficient
(KXi+Kxi=1.0, KIi+Kni=1.0)

DXi: high-density reference balance value of each color derived from accumulated image data of a plurality of image frames;

DIi: low-density reference balance value of each color derived from accumulated image data of a plurality of image frames;

Dxi: high-density reference value of each color of an original to be reproduced;

Dni: low-density reference value of each color of the original;

$\alpha i$ : constant for making a recording density assigned to the high-density reference value appropriate and easy to control; and $\beta i$ : constant for making a recording density assigned to the low-density reference value appropriate and easy to control.

Strictly speaking, even the same type photographic films do not always have an identical characteristics because of the aging, differences in manufacturing process, development, cameras and photographic light sources, and so forth. Therefore, it is preferable to determine the coefficients KXi, Kxi, KIi and Kni according to the characteristics of the original. For example, the closer the characteristics of the original to the average characteristics of the plurality of images, the relationships between KXi and Kxi and between KIi and Kni are inclined toward KXi>Kxi, and KIi>Kni. On the contrary, the greater the influence of the photographic light source on the original, the relationships between KXi and Kxi and between KIi and Kni are inclined toward KXi<Kxi, and KIi<Kni.

It is also possible to use a highlight point and a shadow point, e.g. points at 5% and 95% of a density accumulation histogram, or other density values as high-density and low-density reference values of the original. It is possible to extract a main subject, and determine based on the density of the main subject those density values to be reproduced as highlight and shadow points, and use them as high-density and low-density reference values. In other words, the high-density and low-density reference values should substantially represent white and black in the reproduced image, and various methods for determining these values are possible without departing from the scope of the present invention.

Also in the embodiments of FIGS. 9 and 13, wherein image data mean values or average image data is obtained by accumulating image data of a plurality of images and dividing the accumulated image data by the number of accumulated images, it is alternatively possible to individually store image data of each image. It is also possible to use statistic values such as least square approximate values in place of the mean values. It is further possible to obtain linear or multi-dimensional functions according to multiple regression analysis.

Although high-density and low-density reference balance values are determined for two reference values of each color, the number of the reference balance values is not to be limited to two. For example, an average density of the image or an intermediate density between a maximum density and a minimum density of the image may be designated as a middle-density reference value, to determine middle-density reference balance values based on the middle-density reference value. The middle-density reference values may be used independently, or in combination with the high-density and low-density reference values. It is also possible to select any of the high-density, low-density and middle-density reference balance values.

According to the above embodiment, the gradation is uniformly defined by a maximum reference point and a minimum reference point, or a highlight point and a shadow point. However, gradation data can be insufficient due to insufficient originals or insufficient gradation of the recording medium, e.g. when the gradation is hard in totality. In that case, it is possible to correct those recording densities to some extent, which correspond to a maximum reference point and a minimum reference point, or a highlight point and a shadow point, when producing a gradation balance table. But this correction is not enough. Therefore, it is preferable to make it possible to correct the image data conversion table by multiplying converted data, i.e. recording data with coefficients, so that the total gradation may be converted. The coefficients may be determined by an external device and entered through a manual input device, or may automatically be given for each image. The image data conversion table producer 33 may include several kinds of processing for media conversion to solve problems that may occur when making a hard copy from an image on photographic film, e.g. lightness reproduction, hue, or chroma reproduction is compressed, or a particular color or highlight is enhanced. In an alternative, a media conversion device may be provided in the gradation conversion condition setup device 32 or in connection with the image data conversion table producer 33. The image data conversion table producer 33 may also include other conventional image processing steps, such as image enhancement, pseudo contour elimination, noise elimination, and calibration of mechanical tolerance or variance.

In the above described embodiment, the gradation balance data is obtained by accumulating and averaging pre-scanning image data for each film type. It is alternatively possible to pre-scan at once a plurality of images of the same recording medium as the original image to be printed, to use as pre-scanning data for determining the gradation balance data. All image frames on a photographic filmstrip, or similar image frames on the filmstrip may be pre-scanned. The similarity between the image frames can be detected by statistic analysis of image data in the same way as described above.

For the pre-scanning and the main scanning, a single photometric device may be used commonly, or it is possible to provide separate photometric devices. When using the same photometric device, it is alternatively possible to obtain the pre-scanning image data from the main scanning image data through a pixel density conversion, i.e., by compounding image data of a plurality of pixels to reduce the number of pixels down to hundreds through hundreds thousand.

Alternatively, it is possible to simultaneously pick up image data of a plurality of images in the main scanning mode, and obtain the pre-scanning image data from the main scanning image data by changing pixel density. In that case, the main scanning image data picked up from a plurality of images is stored in a not-shown image memory, and pre-scanning image data is obtained from the main scanning image data through a pixel density conversion or the like.

The term "density" in the description includes not only optical density but also a converted value that corresponds to lightness, a photometric output value from the original, dot percentage, and so forth. Also, an antilogarithmic value may be applicable. The present invention is most preferably applicable to originals on negative films, but also applicable to positive images on reversal films or reflective originals.

In the above embodiments, image data is sorted with reference to green density. But it is possible to use another color, a mean value of three colors, or a weighted mean value of three colors as the standard for image data sorting. Also, a color difference value or color ratio relative to the green density or to the three color mean value, such as "R–G" or "B–G", is applicable as the standard. If the three color mean value is used as the standard for image data sorting, also high-density and low-density reference values should be mean values of three colors. In this way, the method of determining the respective reference values should be changed depending upon what is used as standard for image data sorting.

Thus, the present invention should not be limited to the above described embodiments but, on the contrary, various modifications are possible to those skilled in the art without departing from the scope of the invention as claimed in the appended claims.

What is claimed is:

1. An image data conversion method for a digital printer, for converting input image data, corresponding to a full-color original image on a particular recording medium, to converted image data for production of a corresponding full-color image on a recording material by said digital printer, the method comprising the steps of:

providing predetermined reference gradation characteristics for a reference recording medium type;

obtaining common gradation characteristics for a particular recording medium type pertaining to said particular recording medium, said particular recording medium type being different from said reference recording medium type;

determining conversion conditions based on said common gradation characteristics and said reference gradation characteristics;

converting said input image data to said converted image data using said conversion conditions;

determining a high-density reference value and a low-density reference value of said original from said input image data;

obtaining high-density reference balance values and low-density reference balance values from said common gradation characteristics in correspondence with said high density and low density reference values, respectively;

storing predetermined recording data reference values to which said reference balance values are to correspond;

detecting, for each of three colors:

a first coordinate point defined by said high-density reference balance value of said each color and a corresponding one of said recording data reference values, and a second coordinate point defined by said low-density reference balance value of said each color and a corresponding one of said recording data reference values;

connecting said first coordinate point and said second coordinate point to produce a conversion table function for each said color relating said image data to said recording data; and using said conversion table function as said conversion conditions.

2. An image data conversion method according to claim 1, wherein:

said conversion conditions comprise conversion tables;

said conversion conditions are produced from first characteristic values relating to said predetermined reference gradation characteristics and from second characteristic values relating to said common gradation characteristics; and said second characteristic values relate to a plurality of recording medium types including said particular recording medium type.

3. An image data conversion method according to claim 2, wherein:

said first characteristic values include values relating to the respective color balance of an image of a substantially neutral gray subject recorded on a reference recording medium of said reference recording medium type; and said second characteristic values include values relating to the respective color balance of an image of a substantially neutral gray subject recorded on a recording medium of said particular recording medium type.

4. An image data conversion method according to claim 2, wherein said conversion conditions include a relation between subject brightness and image density for said reference recording medium type, and a relation between subject brightness and image density on said particular recording medium type.

5. An image data conversion method according to claim 2, wherein said first and said second characteristic values relate to accumulated color balance information obtained from the image data of a plurality of images, and are accumulated for each of said plurality of recording medium types.

6. An image data conversion method according to claim 2, wherein:

said first characteristic values are determined based on said recording material for said reproduced image; and said second characteristic values are determined based on image data detected from a plurality of images recorded on said particular recording medium type.

7. An image data conversion method according to claim 1, wherein a weighted mean value of said high-density reference value and said high-density reference balance value and a weighted mean value of said low-density reference value and said low-density reference balance value are obtained for each of said three colors, and said weighted mean values are used for producing said conversion table function for said each color.

8. An image data conversion method according to claim 7, wherein: said reference balance values are weighted more strongly as said gradation balance values of said original approach said gradation balance values obtained from representative values of image data of a great number of images; and said reference values are weighted more strongly for values in which said original is affected more strongly by a photographic light source.

9. An image data conversion method for a digital printer, for converting input image data, corresponding to a color original image on a particular recording medium, to converted image data for production of a corresponding color image on a recording material by said digital printer, the method comprising the steps of:

predetermining a reference gradation for a reference recording medium type;

obtaining a gradation common to a series of images recorded on a recording medium type identical to a particular recording medium type of said particular recording medium and different from said reference recording medium type, said series of images including said original image;

determining conversion conditions based on said reference gradation and on said common gradation;

converting said input image data to said converted image data using said conversion conditions;

determining a high-density reference value and a low-density reference value of said original from said input image data;

obtaining high-density reference balance values and low-density reference balance values from said common gradation in correspondence with said high density and low density reference values, respectively;

storing predetermined recording data reference values to which said reference balance values are to correspond;

detecting, for each of three colors:
  a first coordinate point defined by said high-density reference balance value of said each color and a corresponding one of said recording data reference values, and
  a second coordinate point defined by said low-density reference balance value of said each color and a corresponding one of said recording data reference values;

connecting said first coordinate point and said second coordinate point to produce a conversion table function for each said color relating said image data to said recording data; and using said conversion table function as said conversion conditions.

10. An image data conversion method according to claim 9, wherein:

said conversion conditions comprise conversion tables;

said conversion conditions are produced from first characteristic values relating to said reference gradation and from second characteristic values relating to said common gradation to said series of images; and said second characteristic values are obtained from the image data of said series of images.

11. An image data conversion method according to claim 10, wherein:

said first characteristic values include values relating to the respective color balance of an image of a substantially neutral gray subject recorded on a reference recording medium of said reference recording medium type; and said second characteristic values include values relating to the respective color balance of an image of a substantially neutral gray subject recorded on a recording medium of said particular recording medium type.

12. An image data conversion method according to claim 10, wherein said conversion conditions include a relation between subject brightness and image density for said reference recording medium type, and a relation between subject brightness and image density of said series of images.

13. An image data conversion method according to claim 10, wherein said first and said second characteristic values relate to color balance information obtained from the image data of a great number of images.

14. An image data conversion method according to claim 10, wherein said first characteristic values are obtained based on said recording material for said reproduced image.

* * * * *